United States Patent [19]

Degginger et al.

[11] 3,848,802

[45] Nov. 19, 1974

[54] METHOD AND APPARATUS FOR THE PREPARATION AND EJECTION OF A VISCOUS DILATANT MATERIAL

[75] Inventors: Edward R. Degginger, Convent Station; John S. Frisco, North Bergen, both of N.J.

[73] Assignee: Allied Chemical Corporation, New York, N.Y.

[22] Filed: June 1, 1972

[21] Appl. No.: 258,569

[52] U.S. Cl. ............... 239/10, 239/488, 260/91.3
[51] Int. Cl. .................................................. B05b 1/34
[58] Field of Search ............ 239/10, 399, 487, 488, 239/403; 260/91.3

[56] References Cited
UNITED STATES PATENTS

| 1,450,881 | 4/1923 | Allen | 239/399 |
| 1,757,023 | 5/1930 | Smith | 239/399 |
| 2,764,565 | 9/1956 | Hoppe et al. | 239/399 UX |
| 2,878,063 | 3/1959 | Kish et al. | 239/403 X |

*Primary Examiner*—M. Henson Wood, Jr.
*Assistant Examiner*—Michael Mar
*Attorney, Agent, or Firm*—Ernest D. Buff; Arthur J. Plantamura

[57] ABSTRACT

A method and apparatus for the preparation of a viscous dilatant material and its application to a substrate. Reactants are internally admixed to prepare the dilatant material in a highly efficient manner prior to ejection of the dilatant material in the form of a spray. Conversion to dilatant material is readily effected at efficiencies higher than about 95 percent by weight of the reactants, and the direction and consistency of the spray of dilatant material is easily controlled.

10 Claims, 2 Drawing Figures

METHOD AND APPARATUS FOR THE PREPARATION AND EJECTION OF A VISCOUS DILATANT MATERIAL

BACKGROUND OF THE INVENTION

1. Field of the Invention

This invention relates to the preparation of a viscous dilatant material and its application to a substrate. The invention also relates to a dispensing means for mixing reactants to prepare the dilatant material and then ejecting the formed dilatant material in the form of a spray.

The invention is applicable to any dilatant material which performs physically as called for hereinafter; but inasmuch as the problem of mixing is present with dilatant materials comprising reaction products of compositions which contain an alkali metal borate and a water-soluble vinyl alcohol polymer, the invention will be described in their connection.

2. Description of the Prior Art

The product formed from an alkali metal borate and a water-soluble vinyl alcohol polymer, hereinafter referred to as "dilatant material," is conventionally prepared by combining separate aqueous solutions of an alkali metal borate and a water-soluble vinyl alcohol polymer at ambient temperature. A highly viscous dilatant material is instantly formed which possesses excellent fire retardant and dust suppressant properties. Due to the rapid formation of the dilatant material and its tendency to increase in viscosity when subjected to shear, considerable pressure is required to pump the material prior to spraying or otherwise applying it to a substrate. In order to prepare and apply the dilatant material, it has therefore been necessary to mix the two solutions by spraying a stream comprising one of them into a stream comprising the other at a point external to the dispensing apparatus. The latter practice does not permit sufficient contact between the molecules of the reacting solutions to convert them into the dilatant material in a highly efficient manner. Moreover, when external mixing methods are employed, unreacted droplets of the solutions which do not evaporate before reaching the substrate wet the surface thereof and reduce the tendency of the dilatant material to adhere thereto. Still further, with external mixing methods the direction and consistency of the spray of dilatant material is not easily controlled. For the above reasons, preparation and application of the dilatant material has been relatively expensive.

SUMMARY OF THE INVENTION

The present invention provides an economical method and dispensing means whereby reactants are internally admixed to prepare the dilatant material in a highly efficient manner prior to ejection of the dilatant material from the dispensing means. Separate aqueous solutions of the alkali metal borate and the water-soluble vinyl alcohol polymer, hereinafter referred to as "component A" and "component B," respectively, are passed through separate conduits to a point of convergence within the dispensing means. The dispensing means has an orifice through which the dilatant material is ejected in the form of a spray. A mixing means is located within the dispensing means in communication with the orifice and the point of convergence for thoroughly combining the two components to form the dilatant material.

It has been found that causing the two components to converge within the dispensing means and mixing them therewithin prior to ejection of the dilatant material in the above manner increases intermolecular contact between the molecules of the two components. The proportion of each component converted to dilatant material increases, with the result that the dilatant material is formed in a highly efficient manner. Despite the rapid formation of the dilatant material the pressure required to eject the material from the dispensing means is surprisingly low. The orifice is not clogged by the dilatant material which reaches a highly viscous state during the mixing operation. Hence, ejection is accomplished by a pressure far below that ordinarily expected for material having such a high viscosity. Conversion to dilatant material is substantially complete, i.e., at least about 95 percent by weight of components A and B are converted into dilatant material, and the direction and consistency of the spray of dilatant material is easily controlled. Thus, preparation and application of the dilatant material results in lower costs than those incurred by operations wherein the components are combined at a point external to the dispensing means.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENTS

Figure 1:
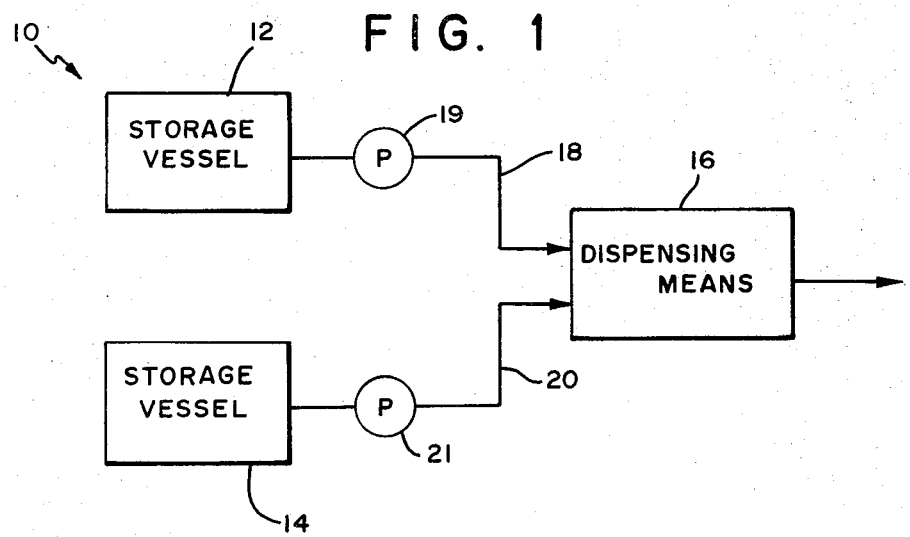
FIG. 1 is a diagrammatic representation of apparatus for preparing and then ejecting a viscous dilatant material.

Referring to FIG. 1 of the drawings, the apparatus, shown generally at 10, includes two storage vessels 12 and 14 separately connected to a dispensing means 16. One of the storage vessels 12 contains component A, and the other storage vessel 14 contains component B. The two components are passed from storage vessels 12 and 14 through conduits 18 and 20 respectively, to a point of convergence within the dispensing means 16. The components are partially converted to dilatant material upon convergence. The dispensing means 16 is provided with an orifice through which the resultant dilatant material is then ejected in the form of a spray. Pumping means 19 and 21 are used to pass the components to the point of convergence and to eject the dilatant material from the apparatus. Other conventional fluid transfer equipment, such as gravity feed equipment, may also be used. The construction and operation of such equipment is well understood by those skilled in the art.

The dilatant material formed by combining components A and B contains from about 0.1 to 5.0 weight percent of each of the alkali metal borate and the water-soluble vinyl alcohol polymer. The concentration of alkali metal borate and vinyl alcohol polymer in the dilatant material preferably ranges from about 0.4 to 4.0 weight percent of each. Most preferably, the alkali metal borate will be present in an amount ranging from about 0.5 to 2.0 weight percent and the vinyl alcohol polymer will be present in an amount ranging from about 1.0 to 3.0 weight percent.

Inasmuch as the flow rates of components A and B could differ, the operable concentration of alkali metal borate and vinyl alcohol polymer in components A and B cannot be given with exactitude. Assuming equal volumes of the two components are being combined, the concentrations of alkali metal borate and vinyl alcohol polymer in the respective separate components could vary from about 0.2 to 10.0 weight percent, which on forming the dilatant material, would provide the final desired concentration of 0.1 to 5.0 weight percent of each. It is, of course, not necessary that the concentration of alkali metal borate and vinyl alcohol polymer in the combined stream be identical since dilatant material is obtained as long as each of components A and B is present in the combined stream in a concentration ranging from 0.1 to 5.0 weight percent.

Component A comprises an aqueous solution of an alkali metal borate. The term alkali metal borate, as used in the instant specification and in the appended claims, embraces not only the alkali metal salts of the common boric acids, i.e., tetraboric acid, $H_2B_4O_7$ and meta-boric acid, $HBO_2$, but also the other boric acids such as $H_2B_2O_4$, $H_2B_6O_{10}$, $H_2B_{12}O_{19}$, $H_6B_4O_9$ and $H_6B_8O_{15}$ which form alkali metal salts. Hydrates of any of the borate salts are also suitable.

Either a single borate salt or any mixture thereof can be used. Alkali metals other than sodium or potassium are perfectly usable but are generally more expensive. The preferred borate is borax, i.e., sodium tetraborate decahydrate.

Component A is readily prepared by dissolving the alkali metal borate in the correct amount of water to provide the desired concentration. It is not possible to dissolve more than about 3.0 weight percent of borax in water at ambient temperature. Other borates likewise have a fairly low solubility in water at about 25°C. The solubility of course increases with increasing temperature. To increase the solubility of borate in cold water, we have found it advantageous to add to the water prior to or simultaneously with the borate from 0.5 to 10 weight percent, based on the weight of the water present in the dilatant material as ultimately constituted, of a $C_2$ to $C_{12}$ water-soluble polyhydric alcohol.

The term "water-soluble polyhydric alcohol" as used in the instant application connotes a $C_2$ to $C_{12}$ polyhydroxy nonaromatic hydrocarbon, i.e., alkane, alkene, cycloalkane, or cycloalkene, having two to eight hydroxyl groups. The term "water-soluble" as applied to such polyols, connotes that the polyol is soluble in water to the extent of at least 25 weight percent at 25°C. Examples of suitable water-soluble $C_2$ to $C_{12}$ polyhydroxy nonaromatic hydrocarbons include, for example, ethylene glycol, diethylene glycol, triethylene glycol, trimethylene glycol, mono- and dipropylene glycol, glycerol, erythritol, pentaerythritol, trimethylol ethane and trimethylol propane, arabitol, adonitol, xylitol, monnitol, sorbitol, iditol, dulcitol, mono- and disaccharides such as glucose, dextrose, fructose, sucrose, Enzose (trademark of Corn Industrial Company connoting a crude glucose), and the like, and various isometric cyclohexane triols and n-hexane triols.

Component B comprises an aqueous solution of a water-soluble vinyl alcohol polymer. The term "water-soluble vinyl alcohol polymer" as used herein and in the appended claims, embraces vinyl alcohol polymers having up to 50 percent of the hydroxyl groups thereof replaced by methoxy, ethoxy, acetyl, propionyl, or butyryl radicals, i.e., partially etherified or esterified polyvinyl alcohol. Such methoxy and ethoxy ether radicals can be unsubstituted or substituted with hydroxyl or carboxyl groups. The acetyl, propionyl and butyryl radicals can likewise be unsubstituted or can be halogen- or hydroxyl-substituted. Preferably, no more than about 20 percent of the polyvinyl alcohol hydroxyl groups will be replaced by any of the aforementioned or ester radicals. The term "water-soluble" means that the polymer is soluble to the extent of at least 5.0 weight percent in water at room temperature, although heating the water to a higher temperature of up to about 95°C. may be necessary in some instances to initially dissolve the polymer.

The vinyl alcohol polymer of component B, can, therefore, be represented by the structural formula:

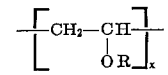

wherein $x$ can range from about 1,200 to about 5,000, preferably 1,600 to 3,000, and wherein R represents hydrogen-, methyl-, ethyl-, acetyl, propionyl-, butyryl-, hydroxyl-, or carboxyl-substituted methyl or ethyl, or halogen- or hydroxyl-substituted acetyl, propionyl or butyryl, and wherein at least 50 percent of the R groups are hydrogen. The water-soluble vinyl alcohol polymers of component B can have molecular weights ranging from about 50,000 to 450,000 and preferably from about 70,000 to 200,000. The most preferred polyvinyl alcohol is from about 98–100 percent saponified with a molecular weight of from about 70,000 to 120,000 ($x$ = about 1,600 to 2,700).

The vinyl alcohol polymers of component B are conventionally obtained by polymerizing esters of vinyl alcohol followed by saponification of the ester groups. To prepare the polymers of component B, wherein up to about 50 percent of the R groups are acyl, one polymerizes the corresponding vinyl ester to produce a polyvinyl ester having all R groups acyl. Such polyvinyl ester is then partially or fully saponified to remove 50 percent or more of the acyl groups. For example, to prepare polyvinyl alcohol containing 20 percent acetyl groups, polyvinyl acetate would be 80 percent saponified and the remaining 20 percent acetyl groups left unsaponified. To prepare the methoxy and ethoxy ether derivatives of polyvinyl alcohol, an essentially fully saponified material, i.e., polyvinyl alcohol having 98+ percent hydroxy groups, as would be obtained by essentially total saponification of a polyvinyl ester, is etherified up to the desired degree, that is, up to about a maximum of 50 percent of the hydroxyl groups can be etherified using conventional etherification agents such as diazomethane, dimethyl sulfate or diethyl sulfate.

Component B is readily prepared by dissolving the vinyl alcohol polymer in the correct amount of water to provide the desired concentration. Dissolution is facilitated if the addition is accompanied by agitation and heating of the water.

Figure 2:
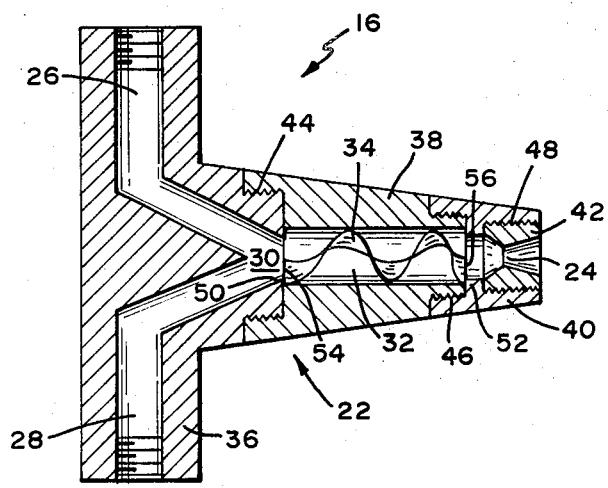
FIG. 2 is a sectional view of one form of the dispensing means shown in FIG. 1.

In FIG. 2 there is illustrated one form of a dispensing means for mixing and then ejecting the dilatant material. Other forms of dispensing means can also be used.

The dispensing means 16 shown in FIG. 2 should therefore be interpreted as illustrative and not in a limiting sense. Such means comprise a substantially rigid housing of metal such as stainless steel, brass or the like. The housing, generally indicated at 22, is preferably comprised of a plurality of sections, including a base section 36, central section 38, head section 40 and nozzle section 42. Each of the respective sections is threaded, so that the sections can be joined as shown in FIG. 2 at portions 44, 46 and 48 of housing 22. The use of a plurality of sections reduces the manufacturing and maintenance costs of the dispensing means 16.

The housing 22 has an orifice 24 therein. At least two passageways 26 and 28, defined by the interior surface of the housing 22, extend from the exterior surface of the housing 22 to a point of convergence 30 therewithin. A mixing chamber 32 extends within housing 22 from the point of convergence 30 to the orifice 24. Alternatively, the passageways 26 and 28 can be extended to a point of convergence within the mixing chamber 32. While in the embodiment of FIG. 2 the mixing chamber 32 is disposed within housing 22 between the point of convergence 30 and the orifice 24, and in the alternative embodiment (not shown) the point of convergence 30 is located within the mixing chamber 32, in each of these embodiments, the mixing chamber is considered to be in communication with the orifice 24 and the point of convergence 30.

The mixing chamber 32 is provided with a mixing means 34. The mixing means 34 can have a variety of configurations. However, the mixing and spraying functions are preferably performed by mixing means which tend to impart a twisting motion to the partially converted components. The mixing means 34 shown in FIG. 2 is in the form of a helical screw, which causes the partially converted components to move in a helical path during the mixing operation. Such helical movement has been found particularly effective in obtaining substantially complete conversion of the components and ejection of the resultant dilatant material in the form of a spray. Accordingly, even though other suitable means for back mixing the partially converted components can be used, it is highly preferred that the mixing means 34 have a helical configuration.

The nozzle section 42 is especially shaped so that the material passing through the orifice 24 therein successively undergoes a sudden construction and a rapid expansion. Due to the viscous nature of the dilatant material, the configuration of the nozzle section 42 is not always sufficient to form the dilatant material into a spray. Surprisingly, however, the twisting motion imparted to the partially converted components by the mixing means 34 greatly enhances the ability of the nozzle section 42 to eject the resultant dilatant material in the form of a spray.

The distance between the point of convergence 30 and the orifice 24 depends in part upon the efficiency of the mixing operation and the viscosity of the resultant dilatant material. For most applications, the distance between the point of convergence 30 and the orifice 24 ranges from about 1 to 6 inches, and preferably from about 2 to 3 inches. This distance has been found sufficient to obtain substantially complete conversion to dilatant material having a viscosity ranging from about $1.8 \times 10^4$ to $2.7 \times 10^6$ centipoises (cps) upon ejection. Moreover, when the point of convergence 30 is separated from the orifice 24 by the above distance, the pressure required to eject the material from the dispensing means 16 is surprisingly low, as in the order of about 50 to 100 pounds per square inch. It would ordinarily be expected that ejection of such a highly viscous material could not be accomplished in the absence of pressures as high as 200 pounds per square inch or more.

The mixing chamber 32 may have either a cylindrical or a polygonal configuration. Generally, the mixing chamber 32 is in the form of a cylinder with the mixing means 34 removably disposed therewithin. Projections 50 and 52 engage the ends 54 and 56 of the mixing means 34 and hold it within the mixing chamber 32 during passage of the partially converted components therethrough.

The diameter and the length of the mixing chamber 32, the diameter and the number of turns of the helical screw, the diameter of the orifice 24, the distance between the point of convergence 30 and the orifice 24 and the pressure at which the partially converted components are forced through the dispensing means 16 can be varied so as to increase or decrease the amount of shear applied to the components within the dispensing means 16. For example, when the dilatant material tends to be highly viscous, the amount of work done on the components can be proportionately decreased by reducing the diameter and the number of turns of the helical screw. The shearing force applied by the dispensing means 16 to the partially converted components can be decreased by (1) decreasing the length of the mixing chamber 32, (2) increasing the diameters of the mixing chamber 32 and the orifice 24, respectively, (3) decreasing the distance between the point of convergence 30 and the orifice 24 and (4) decreasing the pressure at which the partially converted components are forced through the dispensing means 16. Inasmuch as the flow velocity of the dilatant material upon ejection from the dispensing means 16 is inversely proportional to the shearing force applied to the partially converted components therewithin, the flow velocity of the dilatant material upon ejection from the dispensing means 16 can be variably controlled. Thus, dilatant materials having a wide range of viscosities can be mixed within the mixing chamber 32 and then ejected from the orifice 24 of the dispensing means 16 at a relatively wide range of flow velocities. By way of example, components A and B flowing at a velocity ranging from about 300 to 1,200 inches per second have been successfully passed at a pressure ranging from about 50 to 100 pounds per square inch through a dispensing means 16 having a mixing chamber 32 measuring about ¼ inch in diameter × 1 inch in length to 3 inches in diameter × 6 inches in length, a mixing means 34 formed of from about 1 to 4 helical turns of from about 1/16 to ¾ inch diameter cable, an orifice 24 having a diameter of from about ⅛ to 1⅜ inches and a point of convergence 30 located within the dispensing means 16 about 1 to 6 inches from the orifice. The resultant dilatant material having a viscosity of from about $1.8 \times 10^4$ to $2.7 \times 10^6$ cps. was ejected from the dispensing means 16 in the form of a spray of droplets, the average diameter of droplet ranged from about 1/16 to ⅛ inches.

In operation, pumping means 19 and 21 pass components A and B from the storage vessels 12 and 14 through conduits 18 and 20 and passageways 26 and 28 to the point of convergence 30 within the dispensing means 16. The components are partially converted to dilatant material upon their convergence. The partially converted components then pass to the mixing chamber 32 wherein they are admixed by the mixing means 34 in a highly efficient manner to obtain substantially complete conversion to the dilatant material as in the order of about 95 weight percent and higher. Upon exiting the mixing chamber 32 the resultant dilatant material is ejected at a pressure ranging from about 50 to 100 pounds per square inch, preferably from about 80 to 100 pounds per square inch, through the orifice 24 in the form of a spray.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. A process for preparing and then ejecting a viscous dilatant material comprising the steps of:
    a. passing separate aqueous solutions of an alkali metal borate (component A) and a water-soluble vinyl alcohol polymer (component B) through separate conduits to a point of convergence within a dispensing means thereby partially converting each component to said viscous dilatant material;
    b. mixing said partially converted components within said dispensing means to obtain substantially complete conversion to said viscous dilatant material; and
    c. ejecting said viscous dilatant material from the dispensing means in the form of a spray.

2. A process as recited in claim 1 wherein a twisting motion is imparted to the partially converted components during the mixing step.

3. A process as recited in claim 2 wherein said dispensing means has an orifice therein for the ejection of said viscous dilatant material therethrough, and said point of convergence is located about 1 to 6 inches from the orifice.

4. A process as recited in claim 1 wherein said partially converted components move in a helical path during the mixing step.

5. A process as recited in claim 1 wherein said dilatant material contains from about 0.1 to 5.0 weight percent alkali metal borate and from about 0.1 to 5.0 weight percent water-soluble vinyl alcohol polymer.

6. A process as recited in claim 1 wherein the alkali metal borate of component A is an alkali metal salt of a boric acid selected from the group consisting of $H_2B_4O_7$, $HBO_2$, $H_2B_2O_4$, $H_2B_6O_{10}$, $H_2B_{12}O_{19}$, $H_6B_4O_9$ and $H_6B_8O_{15}$.

7. A process as recited in claim 1, wherein the vinyl alcohol polymer of component B has up to about 50 percent of the hydroxyl groups thereof replaced by radicals selected from the group consisting of methoxy, ethoxy, acetyl, propionyl and butyryl radicals.

8. A process as recited in claim 1, wherein said alkali metal borate of component A is sodium tetraborate decahydrate.

9. A process as recited in claim 1, wherein the viscosity of said viscous dilatant material upon ejection from said dispensing means ranges from about $1.8 \times 10^4$ to $2.7 \times 10^6$ centipoises.

10. A process as recited in claim 1, wherein said vinyl alcohol polymer is a polyvinyl alcohol having a molecular weight of from about 70,000 to 120,000, said polyvinyl alcohol being from about 98 to 100 percent saponified.

* * * * *